United States Patent
Hashish (10) Patent No.: US 8,794,846 B2
(45) Date of Patent: Aug. 5, 2014

(54) APPARATUS AND METHODS OF SELF COOLING A VERTICAL MOTOR THRUST BEARING

(71) Applicant: Siemens Industry, Inc., Alpharetta, GA (US)

(72) Inventor: Emam Hashish, Cincinnati, OH (US)

(73) Assignee: Siemens Industry, Inc., Alpharetta, GA (US)

(*) Notice: Subject to any disclaimer, the term of this patent is extended or adjusted under 35 U.S.C. 154(b) by 0 days.

(21) Appl. No.: 13/633,659

(22) Filed: Oct. 2, 2012

(65) Prior Publication Data
US 2014/0093201 A1 Apr. 3, 2014

(51) Int. Cl.
*F16C 33/66* (2006.01)
*F16N 7/14* (2006.01)
*F16N 7/38* (2006.01)

(52) U.S. Cl.
CPC .......... *F16C 33/6659* (2013.01); *F16C 33/6685* (2013.01); *F16N 7/14* (2013.01); *F16N 7/38* (2013.01)
USPC ........... 384/606; 384/316; 384/368; 184/27.2

(58) Field of Classification Search
CPC ............... F16N 9/02; F16N 7/14; F16N 7/38; F16C 33/6659; F16C 33/6685
USPC ......... 384/316, 368, 371, 393, 407, 412, 462, 384/590; 184/6.18, 26, 27.1, 109, 27.2
See application file for complete search history.

(56) References Cited

U.S. PATENT DOCUMENTS

| | | | | |
|---|---|---|---|---|
| 1,570,356 A * | 1/1926 | Lane | | 384/368 |
| 2,089,708 A * | 8/1937 | Puffer | | 415/180 |
| 2,154,759 A * | 4/1939 | Litsinger | | 384/415 |
| 2,251,469 A * | 8/1941 | Smith | | 384/241 |
| 2,804,280 A * | 8/1957 | Wheatley | | 384/313 |
| 2,848,284 A * | 8/1958 | Atkinson et al. | | 384/466 |
| 3,049,356 A * | 8/1962 | Talamonti | | 277/351 |
| 3,198,305 A * | 8/1965 | Marland et al. | | 184/109 |
| 3,405,693 A * | 10/1968 | Sparrow | | 418/61.2 |
| 4,270,064 A | 5/1981 | Glandorf | | |
| 5,271,676 A * | 12/1993 | Keck et al. | | 384/144 |
| 6,125,931 A * | 10/2000 | Hult et al. | | 166/68.5 |
| 6,929,449 B2 * | 8/2005 | Zagone et al. | | 415/206 |
| 7,815,374 B2 | 10/2010 | Hodowanec et al. | | |
| 7,849,970 B2 | 12/2010 | Hodowanec et al. | | |
| 7,878,757 B2 * | 2/2011 | Therrien et al. | | 415/206 |

FOREIGN PATENT DOCUMENTS

| | | | | |
|---|---|---|---|---|
| DE | 3214030 A | * 12/1982 | | F04D 29/04 |
| GB | 253103 A | * 11/1926 | | B02C 2/045 |
| GB | 895612 A | * 5/1962 | | F02D 1/00 |

\* cited by examiner

*Primary Examiner* — Marcus Charles (57) ABSTRACT

Vertical motors having a thrust bearing and an oil deflector positioned in an oil sump in which the thrust bearing is located are disclosed. Oil flowing through the thrust bearing may be spread across the oil deflector and directed down along an inside surface of a wall of the oil sump to allow the oil to cool. The oil deflector may be polished sheet metal. In some embodiments, a plurality of fins may be arranged around an outside surface of the wall to provide additional heat exchange. A fan may additionally be provided to direct air flow between the plurality of fins to further facilitate the heat exchange. Methods of cooling a thrust bearing in a vertical motor are also provided, as are other aspects.

12 Claims, 6 Drawing Sheets

FIG. 1

PRIOR ART

APPARATUS AND METHODS OF SELF COOLING A VERTICAL MOTOR THRUST BEARING

FIELD

The invention relates generally to vertical motors and more particularly to spherical thrust bearings of vertical motors.

BACKGROUND

Vertical motors are commonly used in many pump applications in, e.g., agricultural, petrochemical, water, and wastewater industries. Large vertical motors with high thrust often use spherical thrust bearings to accommodate the high load and/or high speed of the motor. As they rotate, these types of thrust bearings may generate a large amount of heat. This heat may be transferred to lubricating oil in an oil sump in which the thrust bearing may be located. Conventional vertical motors typically cool the oil using a water cooling system having one or more passages immersed in the oil sump. However, vertical motors using such water cooling systems may have several disadvantages. For example, a source of suitable water (i.e., water with either no contaminants or an acceptable level of contaminants) may not be available. Also, water with even an acceptable level of contaminants may still over time cause premature failures in the water system and/or thrust bearing. Furthermore, water from the cooling system may eventually leak into the oil sump, contaminating the oil which may then cause premature failure of the thrust bearing. Accordingly, a need exists to provide improved cooling of spherical thrust bearings used in vertical motors.

SUMMARY

According to a first aspect, a vertical motor is provided that may have improved cooling of a thrust bearing. The vertical motor includes a thrust bearing, an oil sump in which the thrust bearing is located, the oil sump having a wall, and an oil deflector positioned in the oil sump, the oil deflector having a first end and a second end, the first end located proximate to the thrust bearing and the second end located proximate to the wall, the second end positioned to create a gap between the oil deflector and an inside surface of the wall, the oil deflector configured to guide oil received from the thrust bearing to the gap to allow oil to flow down along the inside surface of the wall.

According to another aspect, a vertical motor is provided. The vertical motor includes a thrust bearing, an oil sump in which the thrust bearing is located, the oil sump having a wall and containing oil filled to an oil level, the thrust bearing at least partially immersed in the oil, and an oil deflector positioned in the oil sump, the oil deflector having an inside portion located proximate to the thrust bearing and an outside portion located proximate to the wall, and an upper portion positioned above the oil level, the outside portion configured to create a gap between an outer surface of the outside portion and an inside surface of the wall, the oil deflector configured to guide oil received from the thrust bearing over the upper portion and into the gap.

According to another aspect, a method of cooling a thrust bearing in a vertical motor is provided. The method includes positioning an oil deflector in an oil sump in which a thrust bearing is located, a first end of the oil deflector located proximate to the thrust bearing and a second end of the oil deflector located proximate to a wall of the oil sump, the oil deflector configured to guide oil in the oil sump from the thrust bearing to a gap between the oil deflector and an inside surface of the wall wherein oil is allowed to flow down along the inside surface of the wall, and operating the vertical motor such that oil from the oil sump is driven from the thrust bearing onto the oil deflector.

Still other aspects, features, and advantages of the invention may be readily apparent from the following detailed description wherein a number of exemplary embodiments and implementations are described and illustrated, including the best mode contemplated for carrying out the invention. The invention may also be capable of other and different embodiments, and its several details may be modified in various respects, all without departing from the scope of the invention. Accordingly, the drawings and descriptions are to be regarded as illustrative in nature, and not as restrictive. The drawings are not necessarily drawn to scale. The invention covers all modifications, equivalents, and alternatives falling within the scope of the invention.

DETAILED DESCRIPTION

Reference will now be made in detail to the example embodiments of this disclosure, which are illustrated in the accompanying drawings. Wherever possible, the same reference numbers will be used throughout the drawings to refer to the same or like parts.

The aforementioned problem of cooling a thrust bearing in a vertical motor may be overcome by one or more embodiments of the invention. In one aspect, a vertical motor is provided with an oil deflector that may receive lubricating oil (e.g., heated lubricating oil) emanating from a thrust bearing, wherein the oil pumping ability of the thrust bearing may be utilized. The oil may spread out over the oil deflector to begin cooling, and may then be guided by the oil deflector as a thin film down through a narrow gap between the oil deflector and an inside surface of a wall of the oil sump, which may be the coolest part of the oil sump, to continue cooling. The cooled oil may then be re-circulated through the thrust bearing. In other aspects, methods of cooling a thrust bearing in a vertical motor are provided, as will be explained in greater detail below in connection with FIGS. 1-6.

Figure 1:
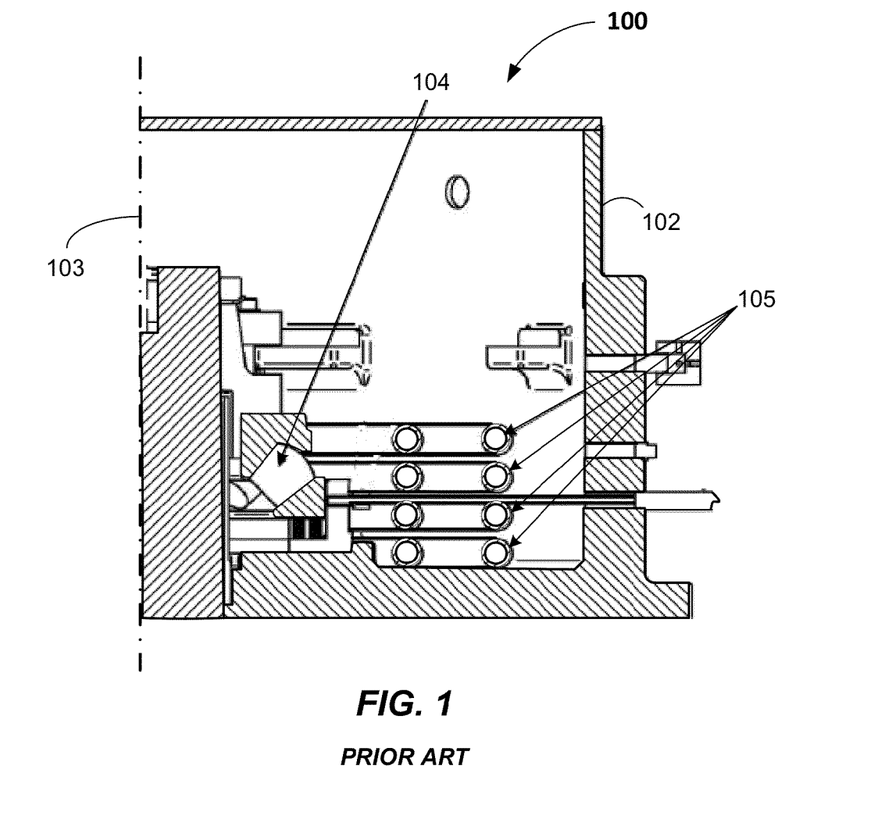
FIG. 1 illustrates a partial cross-sectional view of a thrust bearing oil sump of a vertical motor with a water cooling system according to the prior art.

FIG. 1 illustrates a portion of a known vertical motor 100 that may include a thrust bearing oil sump 102 (note that only a right side of oil sump 102 is shown in relation to motor centerline 103). Thrust bearing oil sump 102 may include a spherical thrust bearing 104 and a series of interconnected water pipes 105 of a water cooling system of vertical motor 100. Water pipes 105 may be arranged around spherical thrust bearing 104 such that they may be partially or completely submerged in lubricating oil contained in oil sump 102. As the spherical thrust bearing rotates, the temperature of the lubricating oil may increase. Heat from the oil may be transferred to the circulating water in water pipes 105, which may then carry the heated water to a heat exchanger (not shown) physically separated from oil sump 102 to cool the water. The circulating water may then be returned via water pipes 105 to oil sump 102. A water cooling system of vertical motor 100 may additionally include a pump to circulate the water through water pipes 105, a reservoir, one or more filters, and/or other suitable components (none shown), some or all of which may add additional cost and maintenance to vertical motor 100.

Figure 2A:
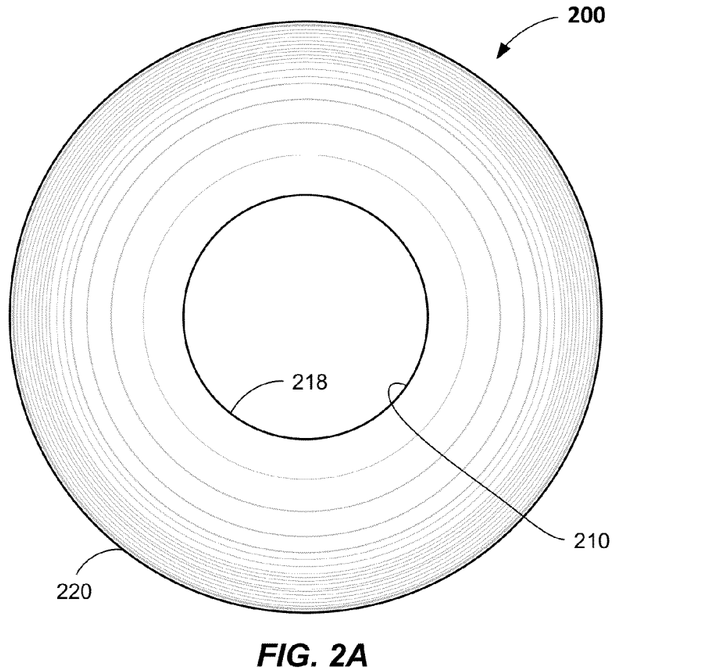
FIGS. 2A and 2B illustrate top plan and cross sectional side views of an oil deflector that may be used in a thrust bearing oil sump of a vertical motor according to embodiments.
Figure 2B:
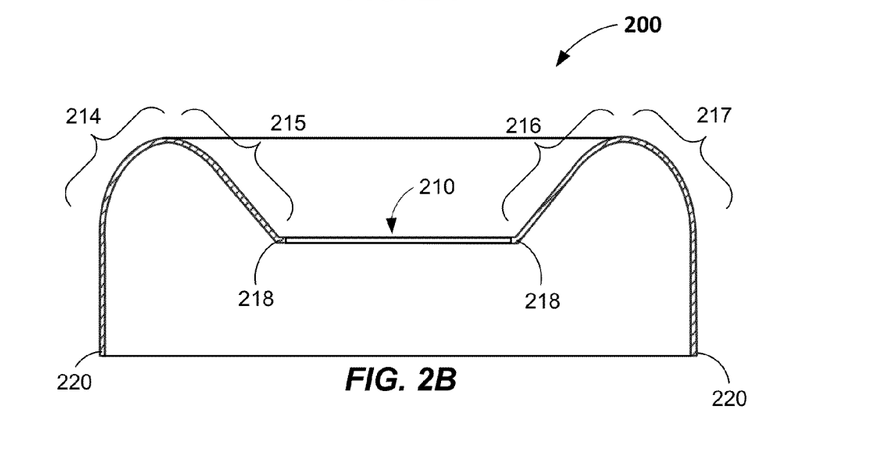

FIGS. 2A and 2B illustrate an oil deflector that may be used in a vertical motor in accordance with one or more embodiments. Oil deflector 200 may have a generally circular shape sized to be positioned in an oil sump of a vertical motor. Oil deflector 200 may also have a central bore 210 sized to fit over at least a portion of thrust bearing and a vertical shaft of the vertical motor. Oil deflector 200 may further have a generally M-shaped cross-sectional configuration, as shown in FIG. 2B. As shown in FIG. 2B, outer portions 214 and 216 of the oil deflector 200 may have a positive slope, while inner portions 215 and 217 of the oil deflector 200 may have a negative slope. In some embodiments, the positive and/or negative slopes may be more or less than those shown in FIG. 2B. Oil deflector 200 may have a first end 218 and a second end 220. The first end may comprise an inner portion, whereas the second end may comprise an outer portion. In some embodiments, first end 218 may be configured to be positioned proximate to a thrust bearing, and second end 220 may be configured to be positioned proximate a wall of an oil sump. The positioning of the second end 220 may be such that a narrow gap is created between an outside surface of the oil deflector 200 and an inside surface of the wall. Oil deflector 200 may be configured to (1) receive hot lubricating oil that has passed through or has been thermally exposed to the thrust bearing, (2) allow the received oil to thin out over the surface area of oil deflector 200 to cool, at least to some extent, and (3) guide the thinned out oil down through a narrow gap between the outside surface of the oil deflector 200 and the inside surface of the oil sump wall. The inside surface of the wall may be the coolest part of the oil sump, and thus may accelerate cooling (a more detailed description is given below in connection with FIGS. 3, 4A, and 4B). The inside wall may be actively cooed in some embodiments. Oil deflector 200 may alternatively have other suitable configurations capable of cooling heated oil in a manner similar or identical to that described herein. In some embodiments, oil deflector 200 may comprise a bent sheet, such as bent and possibly polished sheet metal that may be about on min thick. In some embodiments, oil deflector 200 may comprise stainless steel. Alternatively, any suitable material may be used to construct oil deflector 200.

Figure 3:
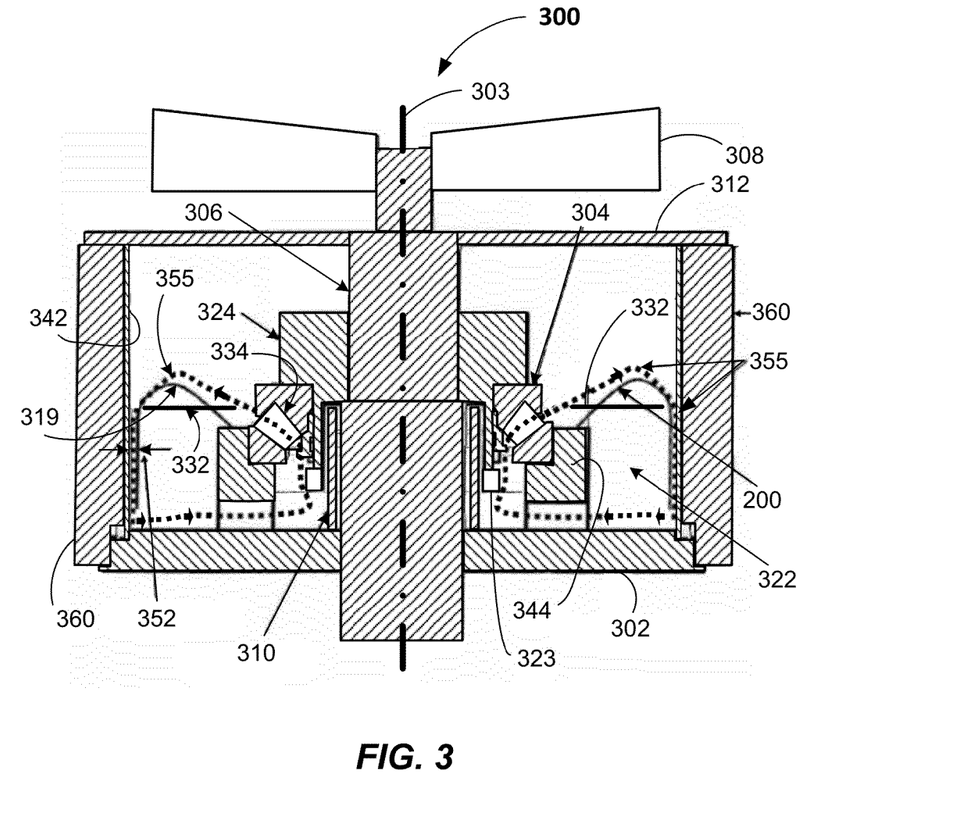
FIG. 3 illustrates a cross-sectional side view of a thrust bearing oil sump of a vertical motor with an oil deflector according to embodiments.

FIG. 3 illustrates a portion of a vertical motor in accordance with one or more embodiments. Vertical motor 300 may include an oil sump 302 that may extend 360 degrees around motor centerline 303. Note that oil sump 302 may, in some cases, be referred to as a bearing housing or an upper bearing bracket. However, the oil sump 302 is configured and adapted to contain a volume of lubricating oil. Vertical motor 300 may include a thrust bearing 304, a vertical shaft 306, an oil standpipe 310, and an oil sump cover 312. Vertical motor 300 may include a fan 308. Thrust bearing 304 may also extend 360 degrees around motor centerline 303 and may be mounted on and/or secured to vertical shaft 306. Thrust bearing 304 may include roller bearings 334, which may be spherical roller bearings, and may support, guide, and reduce friction of motion between fixed and moving parts of vertical motor 300. Thus, the thrust bearing may be a spherical thrust bearing. Other types of thrust bearings may be employed provided they have substantially the same oil pumping ability as the spherical thrust bearing or, if not, an oil slinger is additionally included. A thrust block 324 may transfer an axial thrust load and/or forces driven and/or generated by vertical motor 300 to thrust bearing 304. Fan 308 may be attached to, mounted on, and/or driven by vertical shaft 306. Oil sump 302 may be filled with an amount of lubricating oil 322 that rises to an oil level 332 (measured when thrust bearing 304 and shaft 306 are not rotating). Oil level 332 may be sufficiently high enough to at least partially immerse the thrust bearing 304, and in some embodiments, at least substantially cover roller bearings 334 with oil 322 in order to protect the surface condition of roller bearings 334 and/or substantially reduce oxidation, rusting, and/or corrosion of the active surface of roller bearings 334.

Vertical motor 300 may further include oil deflector 200 positioned in oil sump 302 such that first end 218 of oil deflector 200 may be located proximate to thrust bearing 304, and second end 220 may be located proximate to a wall 342 of the oil sump 302. A narrow gap 352 is created between an outside surface of an outside portion of the oil deflector 200 and an inside surface of the wall 342. In some embodiments, the gap 352 may be about 1 to 5 mm wide. The gap 352 may have a narrow width along a length approximately equal to the oil level height from the sump floor. The gap 352 may be of substantially constant width along this length. First end 218 of oil deflector 200 may be attached to a thrust bearing support structure 344 using any suitable joining or bonding technology or technique, such as, e.g., any suitable adhesive, welding technique, and/or mechanical fastener arrangement (e.g., screws). In some embodiments, second end 220 may be left unattached in the oil sump 302. In other embodiments, the second end 220, and passages may be formed in the second end 220 to allow one or more oil return flow paths. As shown in FIG. 3, upper portion 319 of oil deflector 200 located between the inner portion and outer portion may be positioned above oil level 332. The upper portion 319 of oil deflector 200 may be positioned above oil level 332 by about 10 mm or more, and between about 5 mm and about 30 mm in some embodiments.

When vertical motor 300 operates (i.e., is energized and/or powered such that the thrust bearing 304 and shaft 306 rotate), the rotation of thrust bearing 304 may act as a pump to cause oil 322 to continuously flow and/or circulate within oil sump 302 to, into, across, through, and/or away from thrust bearing 304. The pumping action of thrust bearing 304 may be sufficient to drive oil 322 onto the oil deflector 200 and along an oil flow path 355 (represented by the arrowed and dotted line) as shown in FIG. 3. Oil flow path 355 may begin in the oil sump 302 wherein oil 322 may be driven by the rotation of thrust bearing 304 through thrust bearing 304 where heat generated by the rotating thrust bearing 304 may be transferred to oil 322. Oil 322 may then be driven onto the upper surface of the oil deflector 302 at or near first end 218, where oil 322 may spread or thin out over the upper surface area of portion 319 of oil deflector 200 to begin cooling. Oil 322 may continue to flow over oil deflector 200 and be guided by oil deflector 200 to the gap 352, where oil 322 slides downward as a thin film between the outside surface of the oil deflector 200 and an inside surface of the wall 342 to continue cooling. Wall 342 may be the coolest area within oil sump 302 during operation of vertical motor 302. As oil 322 completes its downward slide in gap 352 along the inside surface of wall 342, cooled oil 322 may return to the oil sump 302, where it may again be drawn up into thrust bearing 304 by the rotating action of thrust bearing 304. In some embodiments, the rotation of thrust bearing 304 may be insufficient to drive the oil 322 onto oil deflector 200 such that oil 322 is able to spread out across the surface area of oil deflector 200, flow over the upper portion 319, and flow into gap 352. In these embodiments, an auxiliary liquid pump 323, such as a paddle-type pump may be installed in oil sump 302 to provide the necessary driving force. The auxiliary liquid pump 323 may be located on a moving component (e.g., thrust block 324), either above or below the bearing 304. The paddles of the paddle-type pump may be formed as part of a moving portion of the thrust bearing 304 in some embodiments. Paddles of the auxiliary liquid pump 323 may be of any suitable shape and angle of attack to cause sufficient flow velocity to drive the oil 322 up and over the upper portion 319 of the oil deflector 200.

Figure 4A:
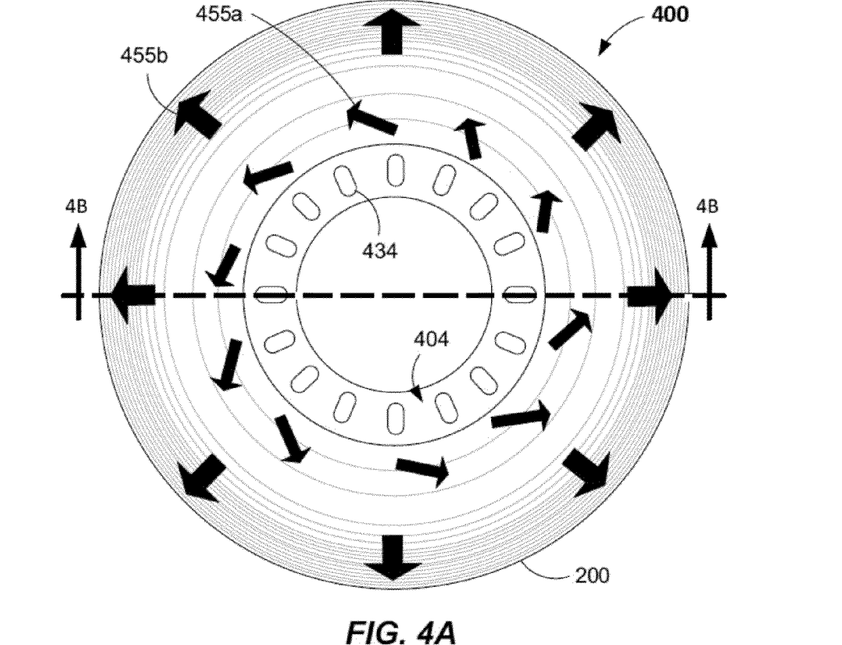
FIGS. 4A and 4B illustrate top plan and side cross-sectional views (the cross-sectional view taken along section line 4B-4B of FIG. 4A) of an oil deflector and thrust bearing showing an oil flow pattern according to embodiments.
Figure 4B:
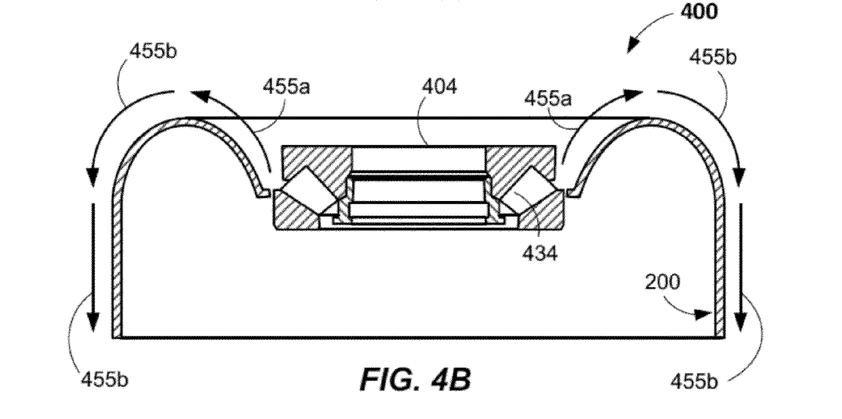

FIGS. 4A and 4B illustrate a representative oil flow pattern across the oil deflector 200 that may be created in accordance with one or more embodiments. Oil flow pattern 400 may be created by the rotating action of a thrust bearing 404 having roller bearings 434 which, in some embodiments, may be spherical roller bearings. Oil flow pattern 400 may include oil flow paths 455a and oil flow paths 455b. Oil flow paths 455a may form a generally circular pattern as oil from an oil sump, such as, e.g., oil sump 302, is drawn through rotating roller bearings 434. Oil received on oil deflector 200 from roller bearings 434 may spread out over portions 215 and 216 (see FIG. 2) of oil deflector 200, as shown in FIG. 4A. As the oil 322 thins and spreads out further, more uniform radial and axial oil flow paths 455b may be formed as the oil flows downward over portions 214 and 217 (see FIG. 2) of oil deflector 200 into a gap (such as, e.g., gap 352). The gaps may be created between oil deflector 200 and the inside surface of a wall of the oil sump (such as, e.g., wall 342), or any other relatively cooler surface. Note that the generally counterclockwise directions of oil flow paths 455a may be dependent on the rotational direction of thrust bearing 404 and, thus, may be reversed (e.g., they may be generally clockwise) if the rotational direction of thrust bearing 404 is reversed.

Returning to FIG. 3, vertical motor 300 may also include a plurality of fins 360 that may be arranged around an outside surface of wall 342 of the oil sump 302. Fins 360 may be radially perpendicular to the wall 342 and extend along a length of the wall 352. Fins 360 may facilitate a heat exchange from oil 322 flowing down along the inside surface of wall 342 through gap 352. Fins 360 may comprise a thermally conductive material and, in some embodiments, fins 360 may comprise aluminum. Furthermore, in some embodiments, fan 308 may provide directed air flow through the plurality of fins 360 to further facilitate the heat exchange from oil 322 via the wall 342 and fins 360. In those embodiments where air flow through a plurality of fins is insufficient, an additional fan may optionally be installed.

Figure 5A:
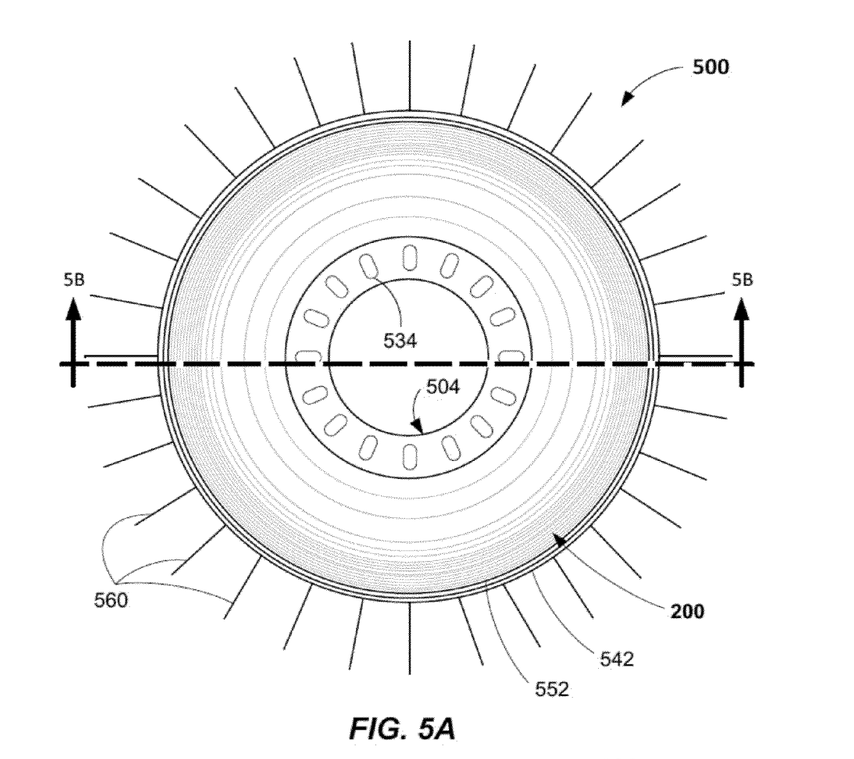
FIGS. 5A and 5B illustrate top plan and side cross-sectional views (the cross-sectional view taken along section line 5B-5B of FIG. 5A) of an oil deflector and thrust bearing with a plurality of fins to facilitate cooling according to embodiments.
Figure 5B:
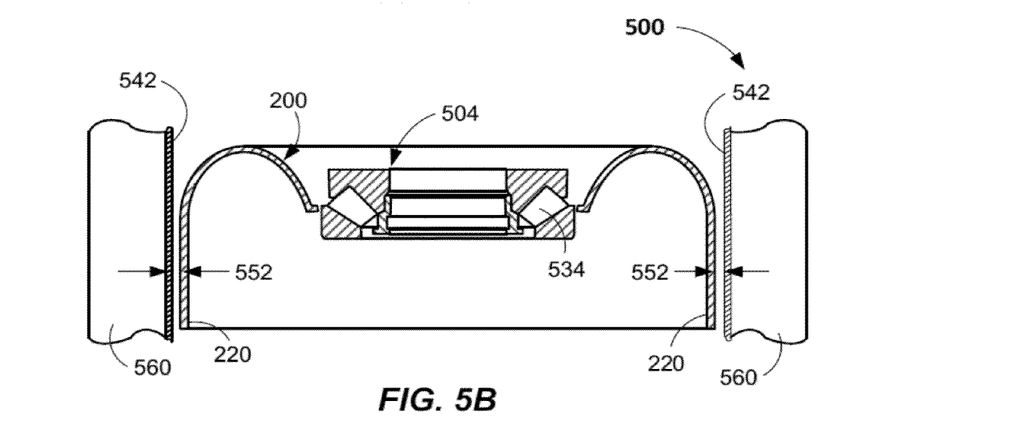

FIGS. 5A and 5B illustrate an arrangement of fins in accordance with one or more embodiments. Arrangement 500 includes a plurality of fins 560 arranged around the perimeter of a wall 542 of an oil sump (not shown) having an oil deflector 200 and a thrust bearing 504 Thrust bearing 504 may have a plurality of rollers 534, which may be spherical roller elements. Oil deflector 200 may have a second end 220 that may form a gap 552 between oil deflector 200 and well 542.

Fins 560 may comprise a thermally conductive material and, in some embodiments, may comprise aluminum. Fins 560 may be arranged perpendicularly to wall 542 and may be equidistantly spaced apart in some embodiments. Other suitable arrangements of fins may alternatively be used in some embodiments. The size, number, and spacing of fins may depend on the size, load, and/or speed of the vertical motor.

For example, a vertical motor having power of 600 HP, a speed of 1800 RPM, and a spherical thrust bearing with an inside diameter of 130 mm may have a bearing housing with a diameter of about 600 mm. The bearing housing may be lined up with fins that are about 80 mm wide and 5 mm thick, on average, and spaced about 25 mm apart around the circumference of the bearing housing.

Figure 6:
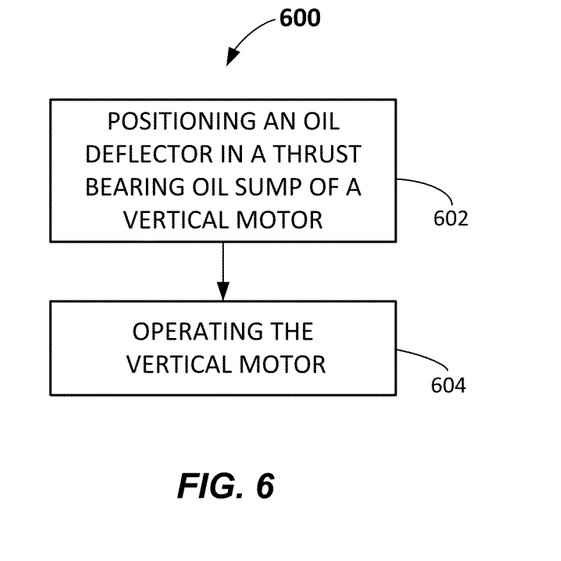
FIG. 6 illustrates a method of cooling a thrust bearing in a vertical motor according to embodiments.

FIG. 6 illustrates a method of cooling a thrust bearing in a vertical motor in accordance with one or more embodiments. Method 600 may include at process block 602 positioning an oil deflector (e.g., oil deflector 200) in an oil sump (e.g., oil sump 302) in which a thrust bearing (e.g., thrust bearing 304) may be located. The oil deflector may have a first end (e.g., first end 218) and a second end (e.g., second end 220) wherein the first end may be proximate the thrust bearing and the second end may be proximate a wall (e.g., wall 342, 542) of the oil sump. In some embodiments, the oil deflector may be configured to allow hot lubricating oil (e.g., oil 322) passing through the thrust bearing to spread out and then flow down into a gap (e.g., gap 352, 552) created between the oil deflector and an inside surface of the wall (e.g., wall 342, 542) to allow the oil to cool. In some embodiments, the oil deflector may have a generally M-shaped cross-sectional configuration of the oil deflector 200, as shown in FIGS. 2B, 3, 4B, 5B).

At process block 604, method 600 may include operating the vertical motor (i.e., energizing and/or powering the vertical motor such that the thrust bearing and a vertical shaft (e.g., thrust bearing 304 and vertical shaft 306, rotate). Operation of the vertical motor may cause oil (e.g., oil 322) from the oil sump (e.g., oil sump 302) to be driven by and through the thrust bearing onto the oil deflector. In some embodiments, the rotation of the thrust bearing during operation of the vertical motor may act as a pump to drive the lubricating oil onto the oil deflector. In other embodiments, a paddle-like pump may be installed in the oil sump to drive the oil passing through the thrust bearing onto the oil deflector. In addition, operation of the vertical motor may include, in some embodiments, operating a fan, which may be located at the top of the vertical motor, such as, e.g., fan 308. Operation of the fan may provide a directed flow of air along the outside surfaces of the oil sump wall and/or between a plurality of fins that may be arranged around the outside surface of the wall to further facilitate cooling of the oil. In those embodiments not having a fan, a fan may be installed to provide directed air flow to the outside surface of the wall and/or the plurality of fins.

Note that persons skilled in the art should readily appreciate that the invention described herein is susceptible of broad utility and application. Many embodiments and adaptations of the invention other than those described herein, as well as many variations, modifications, and equivalent arrangements, will be apparent from, or reasonably suggested by, the invention and the foregoing description thereof, without departing from the substance or scope of the invention. For example, although described in connection with vertical motors and spherical thrust bearings, the invention may be applicable to other types of electric motors or machines and/or types of thrust bearings, such as, e.g., tandem angular contact bearings or hydrodynamic thrust bearings. Accordingly, while the invention has been described herein in detail in relation to specific embodiments, it should be understood that this disclosure is only illustrative and presents examples of the invention and is made merely for purposes of providing a full and enabling disclosure of the invention. This disclosure is not intended to limit the invention to the particular apparatus, devices, assemblies, systems or methods disclosed, but, to the contrary, the intention is to cover all modifications, equivalents, and alternatives falling within the scope of the invention.

What is claimed is:

1. A vertical motor, comprising:
   a thrust bearing;
   an oil sump in which the thrust bearing is located, the oil sump having a wall and containing oil filled to an oil level, the thrust bearing at least partially immersed in the oil; and
   an oil deflector positioned in the oil sump, the oil deflector having an inside portion located proximate to the thrust bearing and an outside portion located proximate to the wall, and an upper portion positioned above the oil level, the outside portion configured to create a gap between an outer surface of the outside portion and an inside surface of the wall, the oil deflector configured to guide oil received from the thrust bearing over the upper portion and into the gap.

2. The vertical motor of claim 1 wherein the oil deflector comprises a generally M-shaped cross-sectional configuration.

3. The vertical motor of claim 1 wherein the oil deflector comprises portions having a positive slope and portions having a negative slope.

4. The vertical motor of claim 1 wherein the oil deflector comprises polished sheet metal.

5. The vertical motor of claim 1 wherein the oil deflector comprises stainless steel.

6. The vertical motor of claim 1 wherein the thrust bearing comprises roller bearings.

7. The vertical motor of claim 1 comprising an auxiliary pump to drive the oil from the thrust bearing onto the oil deflector.

8. A method of cooling a thrust bearing in a vertical motor, the method comprising:
   positioning an oil deflector in an oil sump in which a thrust bearing is located, a first end of the oil deflector located proximate to the thrust bearing and a second end of the oil deflector located proximate to a wall of the oil sump, the oil deflector configured to guide oil in the oil sump from the thrust bearing to a gap between the oil deflector and an inside surface of the wall wherein oil is allowed to flow down along the inside surface of the wall; and
   operating the vertical motor such that oil from the oil sump is driven from the thrust bearing onto the oil deflector.

9. The method of claim 8 comprising flowing oil from the oil sump through the thrust bearing and onto the oil deflector.

10. The method of claim 8 comprising operating an auxiliary pump to drive the oil from the thrust bearing onto the oil deflector.

11. The method of claim 8 comprising cooling the oil received from the thrust bearing onto the oil deflector and into the gap by cooling the wall of the oil sump.

12. The method of claim 8 wherein the positioning an oil deflector comprises positioning an oil deflector having a generally M-shaped cross-sectional configuration in an oil sump in which a thrust bearing is immersed, a first end of the oil deflector proximate the thrust bearing and a second end of the oil deflector proximate a wall of the oil sump.

* * * * *